United States Patent [19]
Kawanabe et al.

[11] Patent Number: 4,649,882
[45] Date of Patent: Mar. 17, 1987

[54] AIR INTAKE SIDE SECONDARY AIR SUPPLY SYSTEM FOR AN INTERNAL COMBUSTION ENGINE EQUIPPED WITH A FUEL INCREMENT CONTROL SYSTEM

[75] Inventors: Tomohiko Kawanabe; Takanori Shiina, both of Utsunomiya; Masahiko Asakura, Tokorozawa; Katsuhiko Kimura, Wako, all of Japan

[73] Assignee: Honda Giken Kogyo Kabushiki Kaisha, Tokyo, Japan

[21] Appl. No.: 819,660

[22] Filed: Jan. 17, 1986

[30] Foreign Application Priority Data

Apr. 16, 1985 [JP] Japan .................. 60-56780[U]

[51] Int. Cl.⁴ ............................ F02M 23/04
[52] U.S. Cl. ........................ 123/438; 123/140; 123/589
[58] Field of Search ......... 123/587, 589, 438, 440, 123/339

[56] References Cited

U.S. PATENT DOCUMENTS

| | | |
|---|---|---|
| 4,052,968 | 10/1977 | Hattori et al. ............... 123/589 |
| 4,153,021 | 5/1979 | Hattori et al. ............... 123/589 |
| 4,335,693 | 6/1982 | Cowles ....................... 123/587 |
| 4,376,369 | 3/1983 | Horikoshi et al. ............ 60/276 |
| 4,436,070 | 3/1984 | Akagi et al. ................. 123/589 |
| 4,476,532 | 10/1984 | Akiyama et al. ............. 123/589 |

Primary Examiner—William A. Cuchlinski, Jr.
Attorney, Agent, or Firm—Pollock, Vande Sande and Priddy

[57] ABSTRACT

An air intake side secondary air supply system for an internal combustion engine having an air intake system using a carburetor and an air intake side secondary air supply passage leading to the downstream of the carburetor, and equipped with a fuel increment control system. The system includes an oxygen concentration sensor producing an output signal whose level is substantially proportional to an oxygen concentration of the exhaust gas, and an open/close valve disposed in the air intake side secondary air supply passage controlled in accordance the output signal of the oxygen concentration sensor. The system is adapted close the open/close valve continuously to stop the air/fuel ratio control when an operation of the fuel increment control system is detected.

12 Claims, 8 Drawing Figures

AIR INTAKE SIDE SECONDARY AIR SUPPLY SYSTEM FOR AN INTERNAL COMBUSTION ENGINE EQUIPPED WITH A FUEL INCREMENT CONTROL SYSTEM

BACKGROUND OF THE INVENTION

1. Field of the Invention

The present invention relates to an air intake side secondary air supply system using a lean oxygen concentration sensor for an internal combustion engine equipped with a fuel increment control system.

2. Description of Background Information

Air-fuel ratio feedback control systems for an internal combustion engine are well known as systems in which oxygen concentration in the exhaust gas of the engine is detected by an oxygen concentration sensor (referred to as $O_2$ sensor hereinafter) and the air-fuel ratio of mixture to be supplied to the engine is feedback controlled in response to an output signal level of the $O_2$ sensor for such purposes of the purification of the exhaust gas and improvements of the fuel economy. As an example of the air-fuel ratio feedback control system, an air-intake side secondary air supply system for the feedback control is proposed, for example, in Japanese Patent Publication No. 55-3533 in which an open/close valve is disposed in an air-intake side secondary air supply passage which leads to the carburetor, on the downstream side of the throttle valve, and the open/close valve is opened or closed in response to an output signal level of the $O_2$ sensor, i.e., a duty ratio control of the amount of the air intake side secondary air is performed. In conventional air intake side secondary air supply systems as this example, it was general to use an $O_2$ sensor whose output signal does not vary in proportion to the oxygen concentration in the exhaust gas. On the other hand, a "lean" $O_2$ sensor has been developed recently, whose output signal varies in proportion to the oxygen concentration in the exhaust gas if the air-fuel ratio of the mixture to be supplied to the engine is on the leaner side of a stoichiometric air-fuel ratio. Further, an air-fuel ratio control method of fuel metering type using the lean $O_2$ sensor for precisely controlling the air-fuel ratio toward a target air-fuel ratio within a lean air-fuel ratio region is already known. For instance, this type of control method is described in Japanese patent application laid open No. 58-59330.

On the other hand, in internal combustion engines, a fuel increment control system is generally provided for improving the driveability, which system is designed to increase an amount of fuel being supplied from the carburetor to the engine according to operating conditions of the engine, to enrich the air-fuel ratio of the mixture.

If an air intake side secondary air supply system using the above mentioned lean $O_2$ sensor is provided in an internal combustion engine equipped with the fuel increment control system, it will become difficult to control the air-fuel ratio of the mixture precisely, to cause adverse effects to the driveability of the engine. More specifically, if the air-fuel ratio is controlled toward the target air-fuel ratio in the lean region while the fuel increment control system is in operation, the air-fuel ratio does not necessarily follow the target air-fuel ratio precisely. Further, engine output power may become insufficient in some occasions in various driving conditions of the engine. Thus, it is very likely that the driveability of the engine will be deteriorated by mere combination of the air intake side secondary air supply system using a lean $O_2$ sensor and the fuel increment control system.

OBJECT AND SUMMARY OF THE INVENTION

An object of the present invention is to provide an air intake side secondary air supply system using a lean $O_2$ sensor, for an internal combustion engine equipped with the fuel increment control system, in which a good driveability of the engine is obtained even during the fuel increment control operation.

According to the present invention, an air intake side secondary air supply system for an internal combustion engine includes an open/close valve disposed in an air intake side secondary air supply passage, and the open/close valve is closed to stop the supply of the air intake side secondary air when an operation of the fuel increment control system is detected.

DETAILED DESCRIPTION OF THE PREFERRED EMBODIMENT

Referring to the accompanying drawings, the embodiment of the air intake side secondary air supply system according to the present invention will be explained hereinafter.

Figure 1:
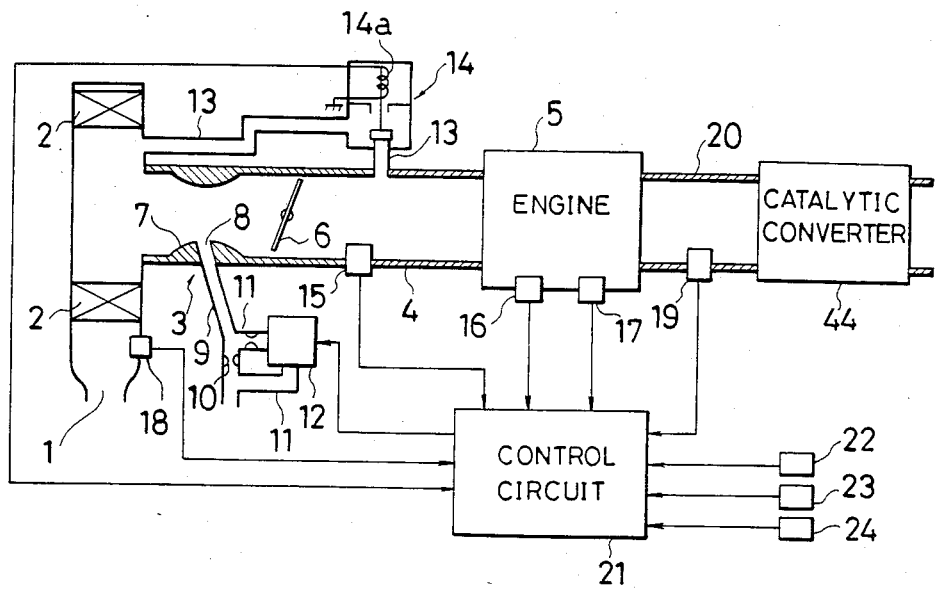
FIG. 1 is a schematic diagram showing a general construction of the system according to the invention.

In FIG. 1 which illustrates a general construction of the air intake side secondary air supply system, an intake air taken at an air inlet port 1 is supplied to an internal combustion engine 5 through an air cleaner 2, a carburetor 3, and an intake manifold 4. The carburetor 3 is provided with a throttle valve 6 and a venturi 7 on the upstream side of the throttle valve 6. In the venturi 7 of the carburetor 3, there opens a main nozzle 8 of a main fuel supply system which connects to a main fuel supply passage 9 in which a main jet 10 is provided. An auxiliary fuel supply passage 11 is provided so as to by-pass the main jet 10 and communicate to a float chamber (not shown). Further, a power valve 12 having a solenoid is provided in the auxiliary fuel supply passage 11 and driven to open when the solenoid is energized. An inside of the air cleaner 2, near an air outlet port, communicates with the intake manifold 4 via an air intake side secondary air supply passage 13. The air intake side secondary air supply passage 13 is provided with an open/close solenoid valve 14. The open/close solenoid valve 14 is designed to open when a drive current is supplied to a solenoid 14a thereof.

The system also includes an absolute pressure sensor 15 which is provided in the intake manifold 4 for producing an output signal whose level corresponds to an absolute pressure within the intake manifold 4, a crank angle sensor 16 which produces pulse signals in response to the revolution of an engine crankshaft (not shown), an engine cooling water temperature sensor 17 which produces an output signal whose level corresponds to the temperature of engine cooling water, an intake air temperature sensor 18 disposed near the air inlet port 1, which produces an output signal whose level corresponds to the temperature of the intake air, and a lean $O_2$ sensor 19 which is provided in an exhaust manifold 20 of the engine for generating an output signal whose level varies in proportion to an oxygen concentration in the exhaust gas.

Figure 2:
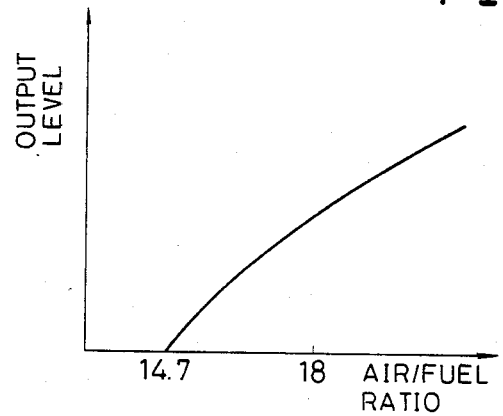
FIG. 2 is a diagram showing a signal output characteristic of the $O_2$ sensor 19 used in the system of FIG. 1.

FIG. 2 shows a signal output characteristic of the $O_2$ sensor 19. As shown, the output signal level of the $O_2$ sensor 19 increases proportionally as the oxygen concentration in the exhaust gas becomes leaner from a stoichiometric air-fuel ratio value (14.7). Further, a catalytic converter 44 for accelerating the reduction of the noxious components in the exhaust gas is provided in the exhaust manifold 20 at a location on the downstream side of the position of the $O_2$ sensor 19. The open/close solenoid valve 14, the absolute pressure sensor 15, the crank angle sensor 16, the engine cooling water temperature sensor 17, the intake air temperature sensor 18, and the $O_2$ sensor 19 are electrically connected to a control circuit 21. Further, a vehicle speed sensor 22 for producing an output signal whose level is proportional to the speed of the vehicle, a clutch switch 23 which turns on to provide an output signal of a predetermined level when a clutch of the vehicle is disengaged, a neutral switch 24 which turns on to provide an output signal of the predetermined voltage when a shift lever of a five speed manual transmission of the vehicle is positioned at a neutral position, are electrically connected to the control circuit 21.

Figure 3:
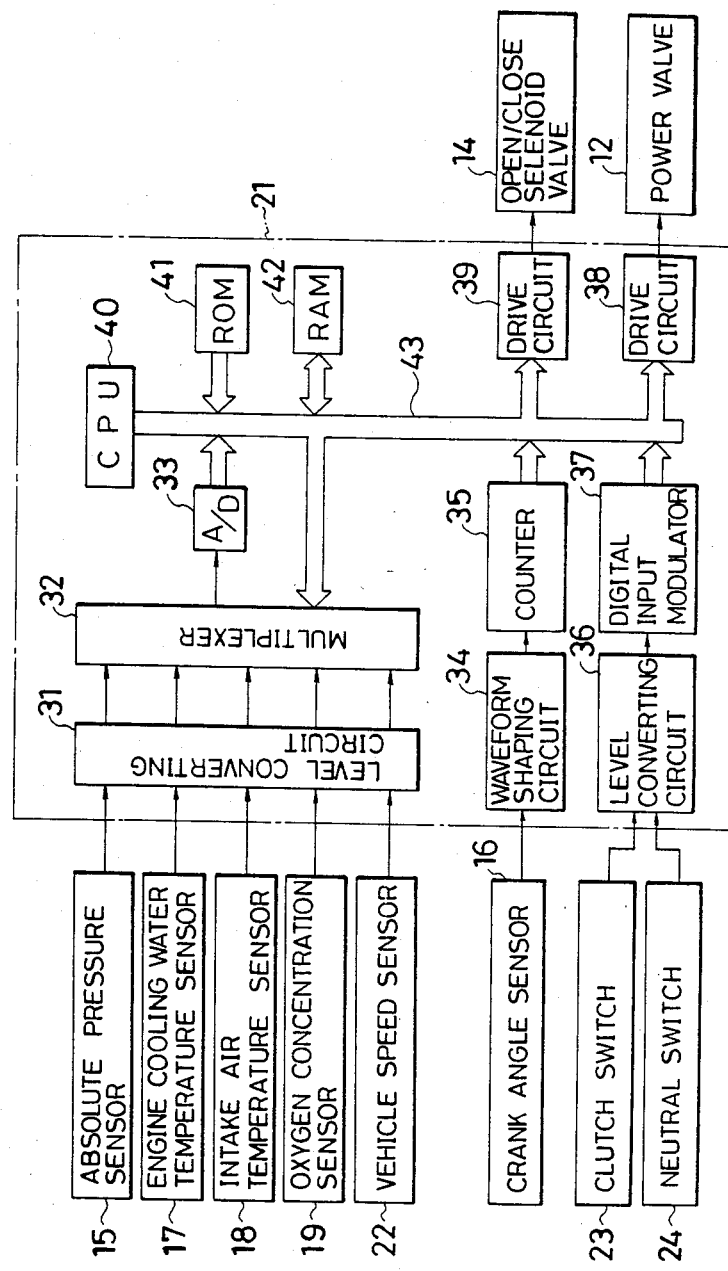
FIG. 3 is a block diagram showing the construction of the control circuit 21 of the system of FIG. 1.

FIG. 3 shows the construction of the control circuit 21. As shown, the control circuit 21 includes a level converting circuit 31 which effects a level conversion of the output signals of the absolute pressure sensor 15, the engine cooling water temperature sensor 17, the intake air temperature sensor 18, the $O_2$ sensor 19, and the vehicle speed sensor 22. Output signals provided from the level converting circuit 31 are in turn supplied to a multiplexer 32 which selectively outputs one of the output signals from each sensor passed through the level converting circuit 31. The output signal provided by the multiplexer 32 is then supplied to an A/D converter 33 in which the input signal is converted into a digital signal. The control circuit 21 further includes a waveform shaping circuit 34 which effects a waveform shaping of the output signal of the crank angle sensor 16, to provide TDC signals in the form of pulse signals. The TDC signals from the waveform shaping circuit 34 are in turn supplied to a counter 35 which counts intervals of the TDC signals. The control circuit 21 further includes a level converting circuit 36 which effects a level conversion of the output signals of the clutch switch 23 and the neutral switch 24, a digital input modulator 37 which provides digital data on the basis of each switch output signal having passed the level converting circuit 36, and drive circuits 38 and 39 for respectively driving the power valve 12 and the open/close solenoid valve 14 in an opening direction, a CPU (central processing unit) 40 which performs digital operations according to programs, and a ROM 41 in which various operating programs and data are previously stored, and a RAM 42. The multiplexer 32, the A/D converter 33, the counter 35, the digital input modulator 37, the drive circuits 38 and 39, the CPU 40, the ROM 41, and the RAM 42 are mutually connected via an input/output bus 43.

In the thus constructed control circuit 21, information of the absolute pressure $P_{BA}$ in the intake manifold 4, the engine cooling water temperature $T_W$, the intake air temperature $T_A$, the oxygen concentration in the exhaust gas, and the vehicle speed $V_H$ are selectively supplied from the A/D converter 33 to the CPU 40 via the input/output bus 43. Further, information indicative of the engine speed $N_e$, and on/off information of the clutch switch 23 and the neutral switch 24 respectively from the counter 35 and the digital input modulator 37 are supplied to the CPU 40 via the input/output bus 43. The CPU 40 is constructed to generate an internal interruption signal every one duty period $T_{SOL}$ (100 msec, for instance). In response to this internal interruption signal, the CPU 40 performs an operation for the duty ratio control of the air intake side secondary air supply, explained hereinafter.

Figure 4:
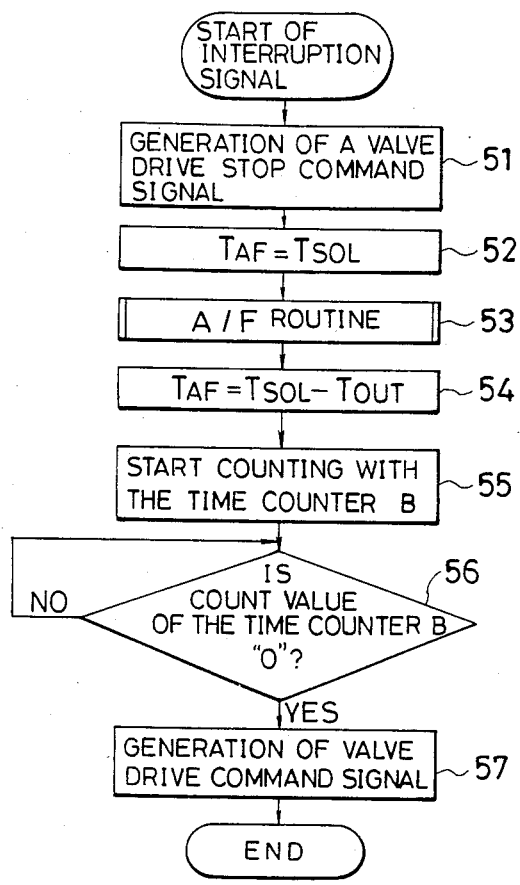
FIGS. 4 and 5 are flowcharts showing the manner of operation of a CPU 40 in the control circuit 21 in a preferred embodiment of the air intake side secondary air supply system according to the present invention.
Figure 5:
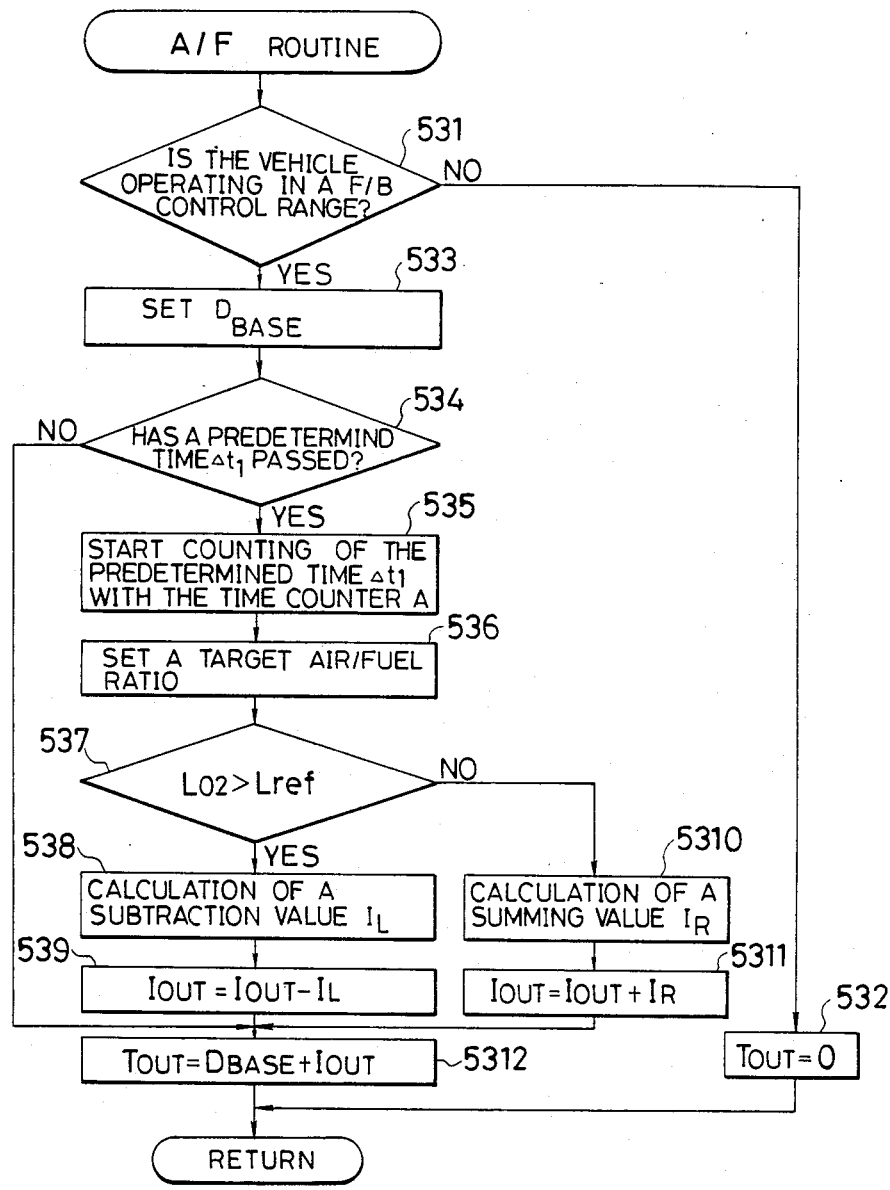

Referring to the flowcharts of FIGS. 4 and 5, the operation of the air intake side secondary air supply system according to the present invention will be explained hereinafter.

At a step 51, a valve open drive stop command signal is generated in the CPU 40 and supplied to the drive circuit 39, at every time of the generation of the internal interruption signal in the CPU 40. With this signal, the drive circuit 39 is controlled to close the open/close solenoid valve 14. This operation is provided so as to prevent malfunctions of the open/close solenoid valve 14 during the calculating operation of the CPU 40. Nextly, a valve close period $T_{AF}$ of the open/close solenoid valve 14 is made equal to a period of one duty cycle $T_{SOL}$ at a step 52, and an A/F routine for calculating a valve open period $T_{OUT}$ of the open/close solenoid valve 14 which is shown in FIG. 5 is carried out through steps generally indicated at 53.

Figure 6:
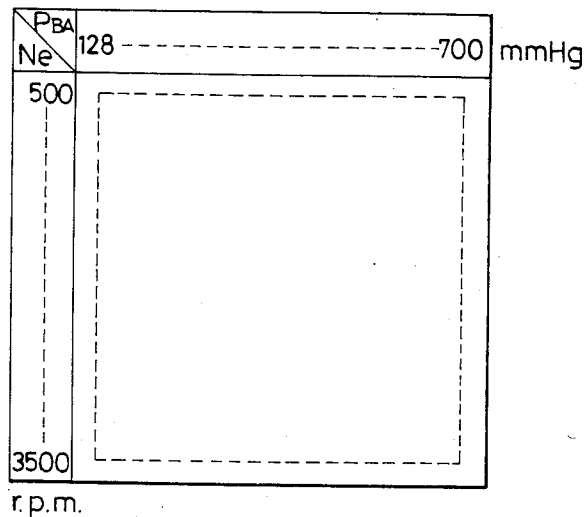
FIG. 6 is a diagram showing a data map which is previously stored in a ROM 41 of the control circuit 21.

In the A/F routine, whether or not operating states of the vehicle (including operating states of the engine) satisfy a condition for the feedback (F/B) control is detected at a step 531. If it is determined that the condition for the feedback control is not satisfied, the valve open period $T_{OUT}$ is made equal to "0" at a step 532. On the other hand, if it is determined that the condition for the feedback control is satisfied, the supply of the secondary air within the period of one duty cycle $T_{SOL}$, i.e., a period of base duty ratio $D_{BASE}$ for the opening of the open/close solenoid valve 14 is set at a step 533. Various values of the period of base duty ratio $D_{BASE}$ which are determined according to the absolute pressure within the intake manifold $P_{BA}$ and the engine speed $N_e$ are previously stored in the ROM 41 in the form of a $D_{BASE}$ data map as shown in FIG. 6, and the CPU 40 firstly reads-in current values of the absolute pressure $P_{BA}$ and the engine speed $N_e$ and in turn searches a value of the period of base duty ratio $D_{BASE}$ corresponding to the read-in values from the $D_{BASE}$ data map in the ROM 41. Then, whether or not a count period of a time counter A incorporated in the CPU 40 (not shown) has reached a predetermined time period $\Delta t_1$ is detected at a step 534. This predetermined time period $\Delta t_1$ corresponds to a delay time from a time of the supply of the air intake side secondary air to a time in which a result of the supply of the air intake side secondary air is detected by the $O_2$ sensor 19 as a change in the oxygen concentration of the exhaust gas. When the predetermined time period $\Delta t_1$ has passed after the time counter A is reset to start the counting of time, the counter is reset again, at a step 535, to start the counting of time from a predetermined initial value. In other words, a detection as to whether or not the predetermined time period $\Delta t_1$ has passed after the start of the counting of time from the intital value by the time counter A, i.e. the execution of the step 535, is performed at the step 534. After the start of the counting of the predetermined time period $\Delta t_1$ by the time counter A in this way, a target air-fuel ratio which is leaner than the stoichiometric air-fuel ratio is set at a step 536. For the setting of the target air-fuel ratio, various values for a reference level Lref corresponding to the target air-fuel ratio which is determined according to the values of the absolute pressure within the intake manifold $P_{BA}$ and the engine speed $N_e$ as in the case of the $D_{BASE}$ data map, are previously stored in the ROM 41 as an A/F data map. Therefore, the CPU 40 searches a reference level Lref corresponding to the current values of the absolute pressure $P_{BA}$ and the engine speed $N_e$ from the A/F data map. Nextly, from the information of the oxygen concentration, whether or not the output signal level $LO_2$ of the $O_2$ sensor 19 is greater than the reference level Lref determined at the step 536 is detected at a step 537. In other words, whether or not an air-fuel ratio of the mixture to be supplied to the engine 5 is leaner than the target air-fuel ratio is detected at the step 537. If $LO_2 >$ Lref, it means that the air-fuel ratio of the mixture is leaner than the target air-fuel ratio, and a subtraction value $I_L$ is calculated at a step 538. The subtraction value $I_L$ is obtained by multiplication among a constant $K_1$, the speed $N_e$, and the absolute pressure $P_{BA}$, ($K_1 \cdot N_e \cdot P_{BA}$), and is dependent on the amount of the intake air of the engine 5. After the calculation of the subtraction value $I_L$, a correction value $I_{OUT}$ which is previously calculated by the execution of the operations of the A/F routine is read out from a memory location $a_1$ in the RAM 42. Subsequently, the subtraction value $I_L$ is subtracted from the correction value $I_{OUT}$, and a result is in turn written in the memory location $a_1$ of the RAM 42 as a new correction value $I_{OUT}$, at a step 539. On the other hand, if $LO_2 \leq$ Lref at the step 537, it means that the current air-fuel ratio of the mixture is richer than the target air-fuel ratio, and a summing value $I_R$ is calculated at a step 5310. The summing value $I_R$ is calculated by a multiplication among a constant value $K_2$ ($\neq K_1$), the engine speed $N_e$, and the absolute pressure $P_{BA}$ ($K_2 \cdot N_e \cdot P_{BA}$), and is dependent on the amount of the intake air of the engine 5. After the calculation of the summing value $I_R$, the correction value $I_{OUT}$ which is previously calculated by the execution of the A/F routine is read out from the memory location $a_1$ of the RAM 42, and the summing value $I_R$ is added to the read out correction value $I_{OUT}$. A result of the summation is in turn stored in the memory location $a_1$ of the RAM 42 as a new correction value $I_{OUT}$ at a step 5311. After the calculation of the correction value $I_{OUT}$ at the step 539 or the step 5311 in this way, the correction value $I_{OUT}$ and the period of base duty ratio $D_{BASE}$ set at the step 533 are added together, and a result of addition is used as the valve open period $T_{OUT}$ at a step 5312.

Additionally, after the reset of the time counter A and the start of the counting from the initial value at the step 535, if it is detected that the predetermined time period $\Delta t_1$ has not yet passed at the step 534, the operation of the step 5312 is immediately executed. In this case, the correction value $I_{OUT}$ calculated by the A/F routine up to the previous cycle is read out.

After the completion of the A/F routine, a valve close period $T_{AF}$ is calculated by subtracting the valve open period $T_{OUT}$ from the period of one duty cycle $T_{SOL}$ at a step 54. Subsequently, a value corresponding to the valve close period $T_{AF}$ is set in a time counter B incorporated in the CPU 40 (not shown), and down counting of the time counter B is started at a step 55. Then whether or not the count value of the time counter B has reached a value "0" is detected at a step 56. If the count value of the time counter B has reached the value "0", a valve open drive command signal is supplied to the drive circuit 39 at a step 57. In accordance with this valve open drive command signal, the drive circuit 39 operates to open the open/close solenoid valve 14. The opening of the open/close solenoid valve 14 is continued until a time at which the operation of the step 51 is performed again. If, at the step 56, the count value of the time counter B has not reached the value "0", the step 56 is effected repeatedly.

Figure 7:
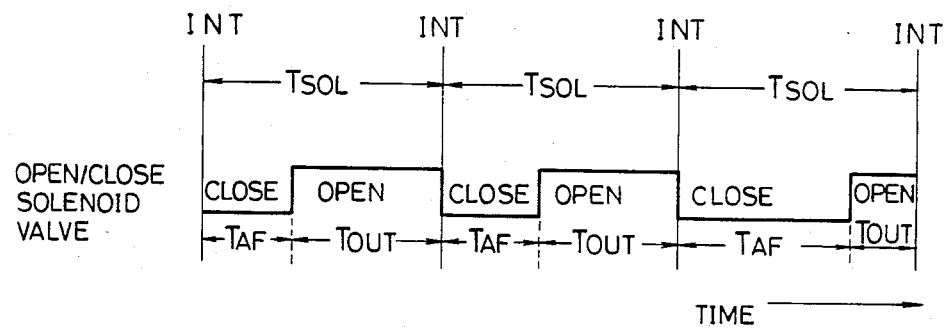
FIG. 7 is a timing chart showing the manner of operation of the system according to the invention generally shown in FIG. 1.

Thus, in the air intake side secondary air supply system according to the present invention, the open/close solenoid valve 14 is closed immediately in response to the generation of the internal interruption signal INT as illustrated in FIG. 7, to stop the supply of the air intake side secondary air to the engine 5. When the valve close time $T_{AF}$ for the open/close solenoid valve 14 within the period of one duty cycle is calculated and the valve close time $T_{AF}$ has passed after the generation of the interruption signal, the open/close solenoid valve 14 is opened to supply the air intake side secondary air to the engine 5 through the air intake side secondary air supply passage 13. Thus, the duty ratio control of the supply of the air intake side secondary air is performed by repeatedly executing these operations. Further, the air-fuel ratio of the mixture to be supplied to the engine 5 is controlled to the target air fuel ratio by a duty ratio control of the supply of the air intake side secondary air. Through these operations, the accuracy of the air-fuel ratio control and the response characteristic of the control system with respect to the air intake side secondary air supply command are improved. Moreover, the delay of response of the control operation due to the change in the operational state of the engine are compensated for by setting the period of base duty ratio $D_{BASE}$ in accordance with the operating condition of the engine.

Since the air intake side secondary air supply system according to the present invention uses a lean $O_2$ sensor 19 whose output signal level is substantially proportional to the oxygen concentration in the exhaust gas as shown in FIG. 2, and the air-fuel ratio is controlled toward a target value which is on the leaner side of the stoichiometric air-fuel ratio, improvements of the fuel economy are realized without deteriorating the driveability.

Figure 8:
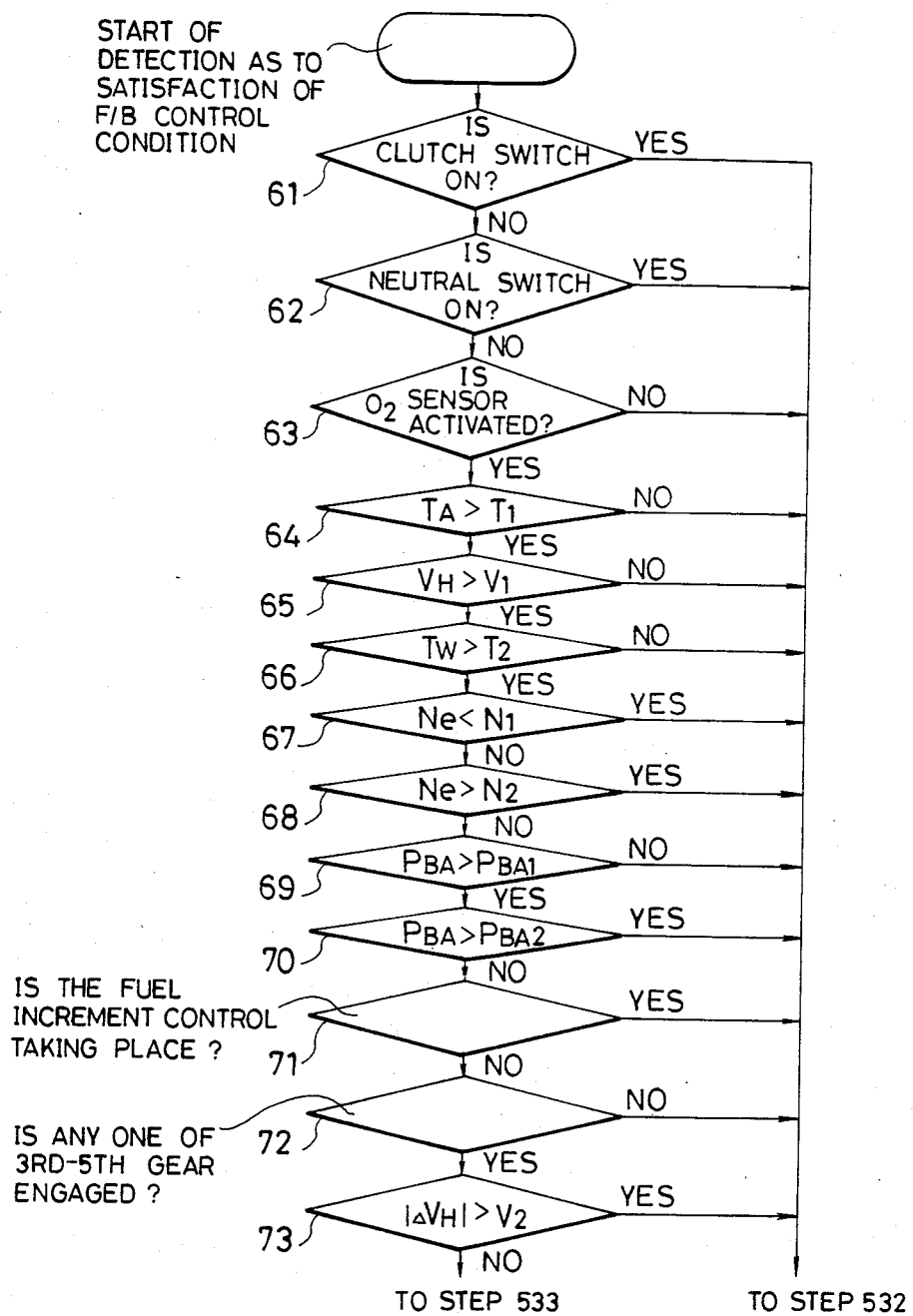
FIG. 8 is a flowchart showing the operation of the system for determining whether conditions for the feedback control of the air-fuel ratio are satisfied.

The detection of the satisfaction of the condition for the air fuel ratio feedback control in the step 531 will be explained more in detail with reference to the flowchart of FIG. 8. In this detection operation, whether or not the clutch switch 23 is turned on is detected at a step 61. If the clutch switch 23 is turned on, it means that the clutch is disengaged. Therefore, it is determined that the shift operation of the transmission is taking place, and the valve open period $T_{OUT}$ is made equal to "0" at a step 532 so as to stop the air-fuel ratio feedback control. If, on the other hand, the clutch switch 23 is turned off, it means that the clutch is engaged. Then whether or not the neutral switch 24 is turned on is detected at a step 62. If the neutral switch 24 is turned on, it means that the shift lever is operated at the neutral position. In this case, it is determined that the shift operation is taking place and the step 532 is also executed. If the neutral switch 24 is turned off, it means that the shift lever of the transmission is operated at any one of the first to fifth gear, and whether or not the $O_2$ sensor 19 has been activated is detected at a step 63. If the $O_2$ sensor 19 is not activated due to a low temperature, the step 532 is executed. If, on the other hand, the $O_2$ sensor 19 has been activated, whether or not the intake air temperature $T_A$ is above a predetermined temperature $T_1$ (15° C. for example) is detected at a step 64. If $T_A \leq T_1$, the step 532 is executed because the intake air temperature is low. If $T_A > T_1$, whether or not the vehicle speed $V_H$ is above a predetermined speed $V_1$ (8 km/h for example) is detected at a step 65. If $V_H \leq V_1$, the step 532 is executed to stop the air-fuel ratio feedback control because the vehicle speed is low. If $V_H > V_1$, whether or not the engine cooling water temperature $T_W$ is above a predetermined temperature $T_2$ (70° C. for example) is detected at a step 66. If $T_W \leq T_2$, the step 532 is executed because the engine cooling water tempertaure is low. If $T_W > T_2$, whether or not the engine speed $N_e$ is below a first predetermined speed $N_1$ (650 r.p.m. for example) is detected at a step 67. If $N_e < N_1$, the step 532 is executed to stop the supply of the air intake side secondary air, because the engine speed is low. If $N_e \geq N_1$, whether or not the engine speed is above a second predetermined speed $N_2$ which is higher than the first predetermined speed $N_1$ (2500 r.p.m. for example) is detected at a step 68. If $N_e > N_2$, the step 532 is executed because the engine speed is high. If $N_e \leq N_2$ whether or not the pressure $P_{BA}$ within the intake manifold 4 is above a first predetermined absolute pressure $P_{BA1}$ (210 mmHg for exmple) is detected at a step 69. If $P_{BA} \leq P_{BA1}$, the step 532 is executed to stop the feedback control of the air-fuel ratio because the engine load is low. If $P_{BA} > P_{BA1}$, whethre or not the absolute pressure $P_{BA}$ is above a second predetermined absolute pressure $P_{BA2}$ greater than the first predetermined absolute pressure $P_{BA1}$ (460 mmHg for example) is detected at a step 70. If $P_{BA} > P_{BA2}$, the step 532 is executed because the engine load is high. If $P_{BA} \leq P_{BA2}$, whether or not the fuel increment control by means of the power valve 12 is taking place is detected at a step 71. The fuel increment control is performed by a fuel increment routine executed by the CPU 40, in such a manner that the CPU 40 supplys a valve drive command signal to the drive circuit 38 to open the power valve 12 for increasing the fuel supply amount if the fuel increment is deteremined during the execution of the fuel increment routine. During the fuel increment operation, a value "1" is set to a fuel increment flag Ff in the CPU 40. Therefore, whether or not the fuel increment is taking place can be detected by means of the state of the fuel increment flag Ff. If Ff=1, it means that the fuel increment is taking place, and the step 532 is executed to stop the feedback control of the air-fuel ratio. If Ff=0, it means that the fuel increment is not taking place, and whether or not the shift lever is operated at any one of the third to fifth gear is detected at a step 72. In this detection, the shift position is determined by means of a ratio between the engine speed $N_e$ and the vehicle speed $V_H$. If it is detected that the shift lever is positioned at either one of the first and second gear, the step 532 is executed because the shift position is in the low speed range. If it is detected that the shift lever is positioned at any one of the third to fifth gear, whether or not a magnitude of variation of the vehicle speed $\Delta V_H$ within a unit time is greater than a predetermined level $V_2$ (2 km/h per unit time for example) is detected at a step 73. If $|\Delta V_H| > V_2$, it means that the vehicle is operating under a transitional state, and the step 532 is executed to stop the feedback control of the air-fuel ratio. If $|\Delta V_H| \leq V_2$, it means that the change in the vehicle speed $V_H$ is small, i.e., the vehicle is operating under a steady state. In this case, it is determined that the condition for the feedback control is satisfied and the step 533 is in turn executed.

When the step 532 is executed, the valve open period $T_{OUT}$ within each duty period $T_{SOL}$ is made equal to "0". Therefore, the open/close solenoid valve 14 is continuously closed to stop the supply of the air intake side secondary air. The air-fuel ratio is made rich in this way.

In the thus operated air intake side secondary air supply system according to the present invention, the feedback control of the air-fuel ratio toward the target value in the lean range is stopped when the fuel increment control operation is taking place. If the feedback operation is executed during the fuel increment control operation, the air-fuel ratio will always be detected to be rich at the step 537 due to the fuel increment. Therefore, the summation value $I_R$ will be added to the correction value $I_{OUT}$ for the integration control every predetermined time period $\Delta t_1$, to increase the correction value $I_{OUT}$ exessively. However, in practice, the steps in the A/F routine after the step 531 are not executed and the correction value $I_{OUT}$ is prevented from being increased exessively. Further, with this operation, the air-fuel ratio control toward the target air/fuel ratio can be started immediately after the ceasing of the fuel increment control.

In the above explained embodiment according to the present invention, the shift position of the transmission, especially the engagement of the low speed gears, was detected by means of the ratio between the engine speed and the vehicle speed. However, the method of detection is not limited to this, and other method such as a method using mechanical switches for detecting the engagement of the low speed gears may be utilized for example.

It will be appreciated from the foregoing, in the air intake side secondary air supply system according to the present invention, the supply of the air intake side secondary air is stopped by the closure of the open/close valve when the fuel increment control is taking place. Thus, the air-fuel ratio is enriched, i.e. the feedback control toward the target air/fuel ratio in the lean range is stopped, during the fuel increment control operation. Therefore, the driveability of the vehicle is greatly improved by a desired increase of the engine output power when the engine load is relatively light, in such occasion that the supply of the fuel is increased at a start of the vehicle.

What is claimed is:

1. An air intake side secondary air supply system for an internal combustion engine having an air intake passage with a carburetor and an exhaust passage and equipped with a fuel increment control system for increasing an amount of fuel in an air/fuel mixture to be supplied to the engine depending on operating states of the engine, comprising:

an air intake side secondary air supply passage leading to the air intake passage on downstream side of the carburetor;

an open/close valve disposed in said air intake side secondary air supply passage;

an oxygen concentration sensor disposed in the exhaust passage and producing an output signal whose level is generally proportional to an oxygen concentration of the exhaust gas when an air/fuel ratio of the air/fuel mixture is leaner than a stoichiometric air/fuel ratio; and control means for controlling a duty ratio of opening of said open/close valve in response to a result of detection as to whether the air/fuel ratio of the air/fuel mixture is leaner or richer than the stoichiometric air/fuel ratio from the output signal of the oxygen concentration sensor, said control means being adapted to close said open/close valve without regard to an output signal level of the oxygen concentration sensor when an operation of the fuel increment control system is detected.

2. An air intake side secondary air supply system as set forth in claim 1, wherein said control means includes means for setting a base duty ratio in response to engine parameters every predetermined duty period, means for setting a correction value for said base duty ratio in accordance with the output signal level of the oxygen concentration sensor every predetermined time period, means for setting a value obtained by adding said correction value to said base duty ratio every said predetermined duty period, as a period of opening of said open/close valve within said predetermined duty period.

3. An air intake side secondary air supply system as set forth in claim 2, said means for setting a correction value includes means for comparing the output signal level of the oxygen concentration sensor with a level corresponding to a target air-fuel ratio every said predetermined time period, and means for adding one of a predetermined subtraction value and a predetermined addition value to a correction value obtained by a previous calculation cycle in accordance with a result of comparison by said comparing means, to renew the correction value.

4. An air intake side secondary air supply system as set forth in claim 1, further comprising detection means for detecting a shift operation of a manual transmission of the vehicle, and wherein said control means closes said open/close valve continously to stop an air/fuel ratio feedback control when the shift operation of the manual transmission is detected by said detection means.

5. An air intake side secondary air supply system as set forth in claim 4, further comprising detection means for detecting an activation of said oxygen concentration sensor, and wherein said control means closes said open/close valve continously to stop the air/fuel ratio feedback control when the activation of the oxygen concentration sensor is not detected by said detection means.

6. An air intake side secondary air supply system as set forth in claim 5, further comprising detection means for detecting an intake air temperature, and wherein said control means closes said open/close valve continously to stop the air/fuel ratio feedback control when the intake air temperature detected by said detection means is below a predetermined level.

7. An air intake side secondary air supply system as set forth in claim 6, further comprising detection means for detecting a vehicle speed, and wherein said control means closes said open/close valve continously to stop the air/fuel ratio feedback control when the vehicle speed detected by said detection means is below a predetermined level.

8. An air intake side secondary air supply system as set forth in claim 7, further comprising detection means for detecting an engine cooling water temperature, and wherein said control means closes said open/close valve continously to stop the air/fuel ratio feedback control when the engine cooling water temperature detected by said detection means is below a predetermined level.

9. An air intake side secondary air supply system as set forth in claim 8, further comprising detection means for detecting an engine speed, and wherein said control means closes said open/close valve continously to stop the air/fuel ratio feedback control when the engine speed detected by said detection means is out of a predetermined speed range.

10. An air intake side secondary air supply system as set forth in claim 9, further comprising detection means for detecting an absolute pressure within the intake manifold of the engine, and wherein said control means closes said open/close valve continously to stop an air/fuel ratio feedback control when the absolute pressure detected by said detection means is out of a predetermined pressure range.

11. An air intake side secondary air supply system as set forth in claim 10, further comprising detection means for detecting a gear position of the manual transmission, and wherein said control means closes said open/close valve continously to stop the air/fuel ratio feedback control when the gear position detected by said detection means is one of low speed gears.

12. An air intake side secondary air supply system as set forth in claim 11, further comprising detection means for detecting a transitional state of a vehicle running state, and wherein said control means closes said open/close valve continously to stop the air/fuel ratio feedback control when the transitional state is detected by said detection means.

* * * * *